United States Patent
Jaitly et al.

(10) Patent No.: US 8,638,120 B2
(45) Date of Patent: Jan. 28, 2014

(54) PROGRAMMABLE GATE ARRAY AS DRIVERS FOR DATA PORTS OF SPARE LATCHES

(75) Inventors: Ashish Jaitly, Bangalore (IN); Sridhar H. Rangarajan, Bangalore (IN); Thomas E. Rosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 13/246,037

(22) Filed: Sep. 27, 2011

(65) Prior Publication Data

US 2013/0076391 A1    Mar. 28, 2013

(51) Int. Cl.
*G06F 7/38* (2006.01)

(52) U.S. Cl.
USPC .............. 326/40; 326/41; 326/47; 716/101; 716/110; 716/139

(58) Field of Classification Search
USPC .............. 326/37–41, 47; 716/102, 101, 110, 716/137–139
See application file for complete search history.

(56) References Cited

U.S. PATENT DOCUMENTS

| | | | |
|---|---|---|---|
| 5,958,026 A | 9/1999 | Goetting et al. | |
| 6,031,981 A | 2/2000 | Lee et al. | |
| 6,292,930 B1 | 9/2001 | Agrawal et al. | |
| 6,453,454 B1 * | 9/2002 | Lee et al. | 716/102 |
| 6,625,795 B1 | 9/2003 | Anderson et al. | |
| 6,954,917 B2 | 10/2005 | How et al. | |
| 7,007,248 B2 | 2/2006 | Blinne et al. | |
| 7,191,426 B1 | 3/2007 | Singh et al. | |
| 7,305,640 B1 | 12/2007 | Phoon et al. | |
| 7,644,382 B2 | 1/2010 | Budumuru | |
| 7,683,403 B2 * | 3/2010 | Tripathi | 257/202 |
| 2003/0229873 A1 * | 12/2003 | Casavant | 716/6 |
| 2006/0075370 A1 * | 4/2006 | Williams et al. | 716/11 |
| 2009/0101940 A1 | 4/2009 | Barrows et al. | |
| 2009/0178013 A1 * | 7/2009 | Wang et al. | 716/2 |
| 2009/0183134 A1 | 7/2009 | Herzl et al. | |
| 2009/0206876 A1 * | 8/2009 | Liu | 326/39 |

* cited by examiner

*Primary Examiner* — Jason M Crawford

(74) *Attorney, Agent, or Firm* — Richard M. Kotulak; Hoffman Warnick LLC

(57) ABSTRACT

Aspects of the invention provide for improving a success rate of an engineering design change (ECO) for an integrated circuit. In one embodiment, aspects of the invention include a method for improving a success rate of an engineering design change (ECO) for an integrated circuit, including: identifying a plurality of spare latches within the integrated circuit; determining an input driver for each of the spare latches; and replacing each input driver with a programmable gate array, such that the programmable gate array is programmed to a functionality of the input driver.

3 Claims, 4 Drawing Sheets

PROGRAMMABLE GATE ARRAY AS DRIVERS FOR DATA PORTS OF SPARE LATCHES

BACKGROUND OF THE INVENTION

The subject matter disclosed herein relates generally to integrated circuits. More specifically, the disclosure provided herein relates to a method, an integrated circuit, and a design structure for including programmable gate arrays as data port drivers of spare latches.

Typically, design changes come up in the final phase of the circuit design, which need to be implemented without affecting the processed sections. These changes are conventionally known as an engineering change order (ECO). In order to satisfy the need to implement these ECOs, spare circuitry is normally included in the circuit design. Spare latches are an example of this spare circuitry and are often used to implement the ECOs.

The input drivers connected to the data ports of the spare latches that are also used to implement the ECOs sometimes do not have enough drive strength to drive the latches. This can result in slow violations and other timing related problems. Further, it is difficult to remove an existing input driver when an input driver with a different functionality is required by an ECO.

BRIEF DESCRIPTION OF THE INVENTION

Aspects of the invention provide for improving a success rate of an engineering design change (ECO) for an integrated circuit. In one embodiment, aspects of the invention include a method for improving a success rate of an engineering design change (ECO) for an integrated circuit, comprising: identifying a plurality of spare latches within the integrated circuit; determining an input driver for each of the spare latches; and replacing each input driver with a programmable gate array, such that the programmable gate array is programmed to a functionality of the input driver.

A first aspect of the invention provides a method for improving a success rate of an engineering design change (ECO) for an integrated circuit, comprising: identifying a plurality of spare latches within the integrated circuit; determining an input driver for each of the spare latches; and replacing each input driver with a programmable gate array, such that the programmable gate array is programmed to a functionality of the input driver.

A second aspect of the invention provides an integrated circuit, comprising: a plurality of spare latches within the integrated circuit; and a plurality of programmable gate arrays, each programmable gate array connected to a data port of each of the spare latches, wherein each programmable gate array is programmed to a desired functionality.

A third aspect of the invention provides a design structure tangibly embodied in a machine readable medium for designing, manufacturing, or testing an integrated circuit, the design structure comprising: a plurality of spare latches within the integrated circuit; and a plurality of programmable gate arrays, each programmable gate array connected to a data port of each of the spare latches, wherein each programmable gate array is programmable to a desired functionality.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates generally to integrated circuits. More specifically, the disclosure provided herein relates to a method, an integrated circuit, and a design structure for including programmable gate arrays as data port drivers of spare latches.

Typically, design changes come up in the final phase of the circuit design, which need to be implemented without affecting the processed sections. These changes are conventionally known as an engineering change order (ECO). In order to satisfy the need to implement these ECOs, spare circuitry is normally included in the circuit design. Spare latches are an example of this spare circuitry and are often used to implement the ECOs.

The input drivers connected to the data ports of the spare latches that are also used to implement the ECOs sometimes do not have enough drive strength to drive the latches. This can result in slow violations and other timing related problems. Further, it is difficult to remove an existing input driver when an input driver with a different functionality is required by an ECO.

Aspects of the invention provide for improving a success rate of an engineering design change (ECO) for an integrated circuit. In one embodiment, aspects of the invention include a method for improving a success rate of an engineering design change (ECO) for an integrated circuit, comprising: identifying a plurality of spare latches within the integrated circuit; determining an input driver for each of the spare latches; and replacing each input driver with a programmable gate array, such that the programmable gate array is programmed to a functionality of the input driver.

Figure 1:
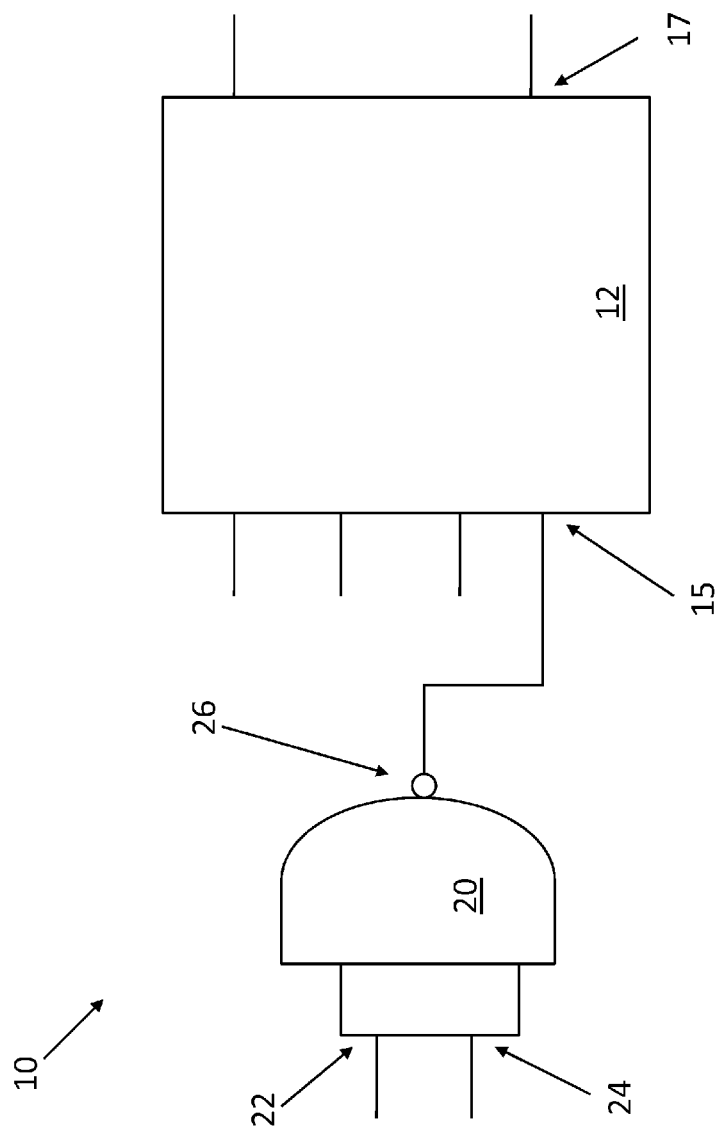
FIG. 1 shows a partial diagram of a conventional integrated circuit.

Turning now to FIG. 1, a partial diagram of a conventional integrated circuit 10 is shown. Although only a single spare latch 12 is shown, it is understood that the integrated circuit 10 may include any number of spare latches 12. Spare latch 12 includes a data port 15 and an output pin 17. As mentioned above, spare latch 12 may be used to implement an engineering design order (ECO) that requires a change to the integrated circuit 10.

An input driver 20 is connected to the data port 15 of the spare latch 12. The input driver 20 is shown as a NAND gate; however, it is understood that the input driver 20 may include any suitable now known or later developed Boolean logic gate. For example, the input driver 20 may include an AND gate, an OR gate, an XOR gate, or a NOT gate. As known in the art, the input driver 20, as a Boolean logic gate, will implement a Boolean function on one or more logic inputs (in this case, as shown in FIG. 1, there are two inputs), and produce a single logic output.

Figure 2:
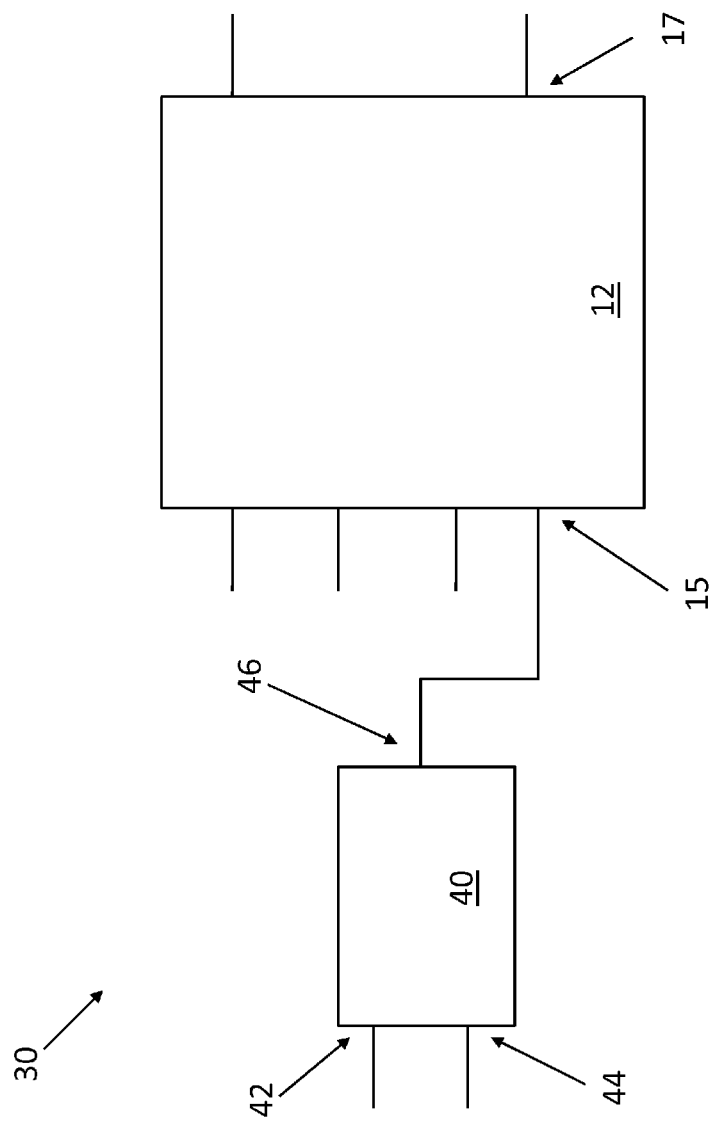
FIG. 2 shows a partial diagram of an integrated circuit according to embodiments of the invention.

Referring now to FIG. 2, a partial diagram of an integrated circuit 30 according to embodiments of the invention is shown. As clearly shown in FIG. 2, the input driver 20 is replaced by a programmable gate array 40. The programmable gate array 40 may be programmed to functionally operate as any Boolean logic gate that is desired. Following the example shown in FIG. 1, the programmable gate array 40 includes a functionality that operates like the Boolean NAND gate shown in FIG. 1. That is, if input pins 42 and 44 both include a "1", is the only time the output pin 46 of the gate array 40 is set to output a "0".

The gate array 40 may be reprogrammed if any subsequent ECO (not shown) is received. That is, if an ECO orders a change of the input driver 20 to an OR gate, gate array 40 may be programmed to operate according to the functionality of an OR gate.

Figure 3:
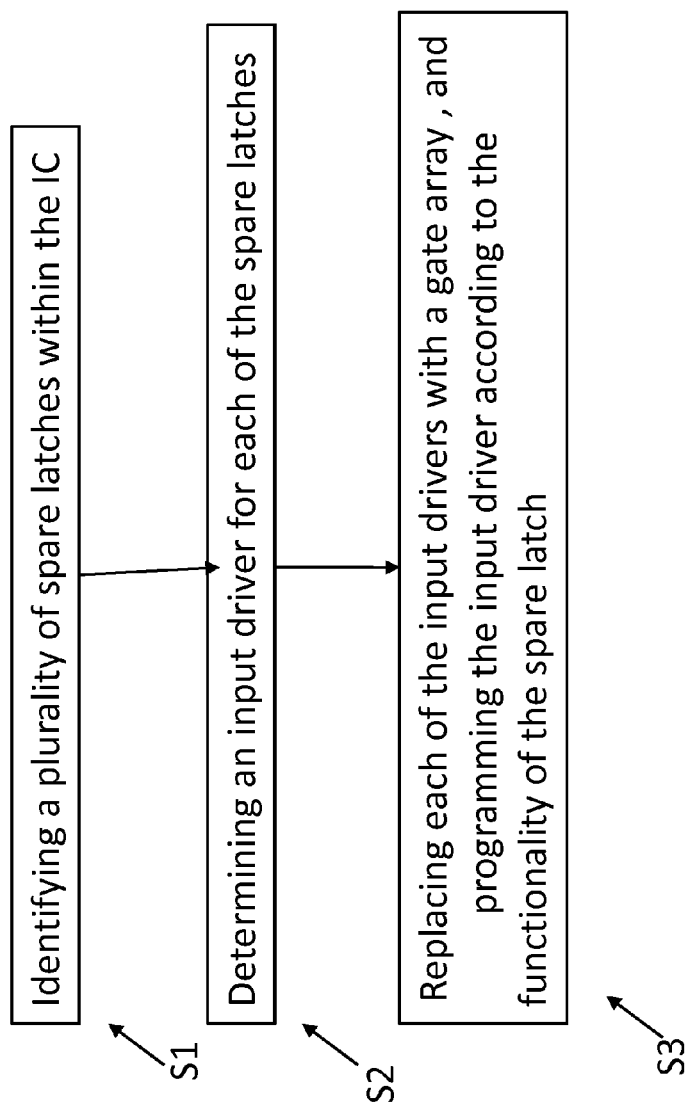
FIG. 3 shows a flow diagram according to embodiments of the invention.

Turning now to FIG. 3, a flow diagram according to embodiments of the invention is shown. At step S1, the plurality of spare latches 12 are identified within the integrated circuit. At step S2, the input driver 20 is determined for each of the spare latches 12. This includes determining the functionality and the input/output pins of the input driver.

At step S3, each input driver 20 is replaced with a programmable gate array 40. This step includes removing each input driver 20 prior to replacing each input driver 20 with the programmable gate array 40. The programmable gate array 40 may be programming to include the functionality and the input/output pins of the input driver 20. Further, each programmable gate array 40 is connected to the data port 15 of a respective spare latch 12. As mentioned above, when an ECO is received, the gate array 20 may be programmed according to the ECO. It is understood that each programmable gate array includes a higher driver strength that the input driver that is replaced.

Figure 4:
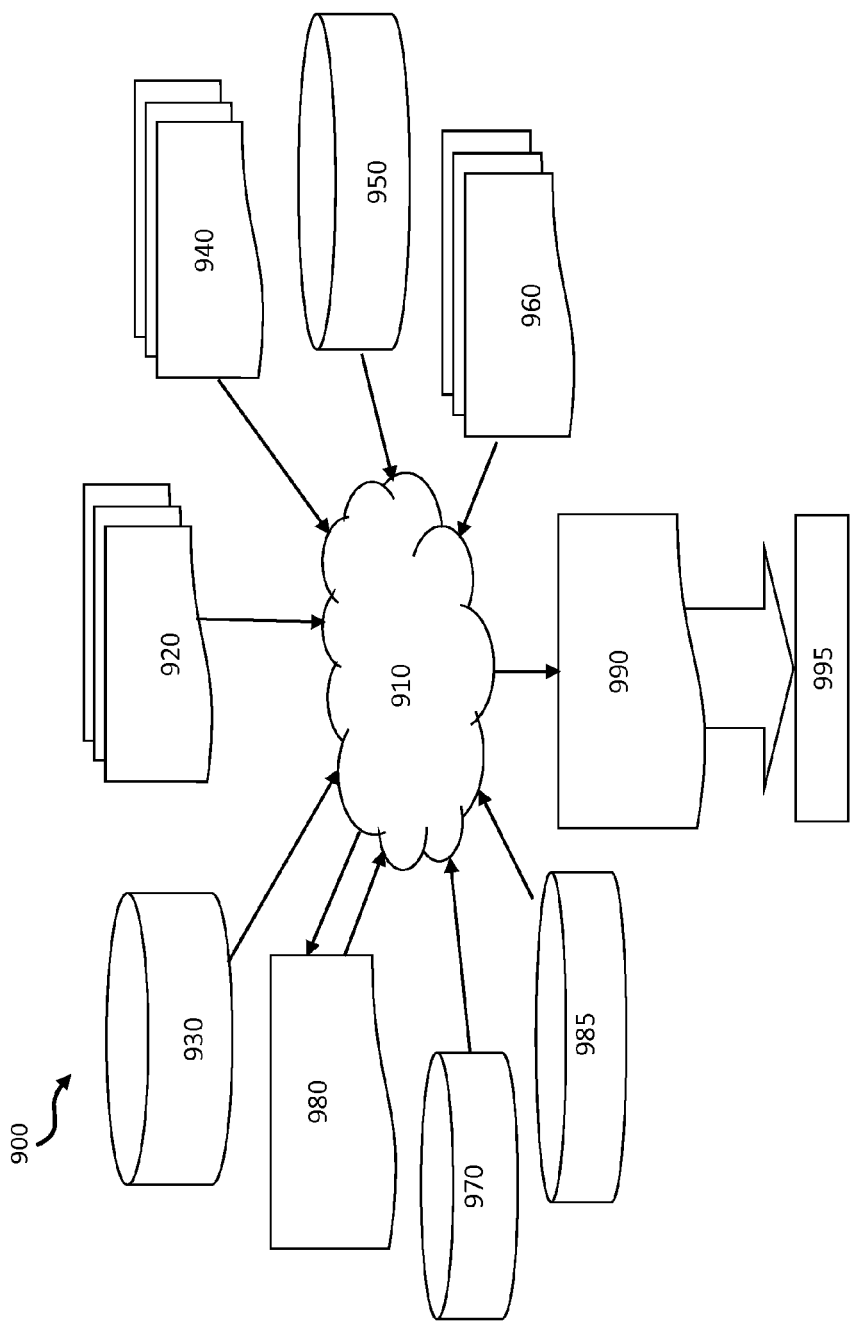
FIG. 4 is a flow diagram of a design process used in semiconductor design, manufacture, and/or test.

FIG. 4 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIG. 2. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 4 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIG. 2. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIG. 2 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIG. 2. In one embodiment, design structure 990 may comprise a compiled, executable HDL simulation model that functionally simulates the devices shown in FIG. 2.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 2. Design structure 990 may then proceed to a stage 995 where, for example, design structure 990: proceeds to tape-out, is released to manufacturing, is released to a mask house, is sent to another design house, is sent back to the customer, etc.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for improving a success rate of an engineering design change (ECO) for an integrated circuit, comprising:
   identifying a plurality of spare latches within the integrated circuit;
   determining an input driver for each of the spare latches;
   determining a functionality of each of the input drivers and input/output pins of each of the input drivers;
   receiving the ECO for the integrated circuit;
   removing each input driver in response to receiving the ECO for the integrated circuit;
   replacing each input driver with a programmable gate array in response to receiving the ECO for the integrated circuit;
   programming each programmable gate array according to the ECO in response to receiving the ECO for the integrated circuit, the programming including programming each programmable gate array to include the functionality of the input driver being replaced and to include the input/output pins of the input driver, wherein each programmable gate array is programmed to include a higher driver strength than each of the input drivers that are replaced in response to receiving the ECO.

2. The method of claim 1, wherein the input driver includes a Boolean logic gate.

3. The method of claim 1, wherein replacing each input driver with the programmable gate array includes connecting each programmable gate array to a data port of each spare latch.

* * * * *